June 6, 1939. A. V. BOGGILD 2,161,610
METHOD AND APPARATUS FOR MAKING SELF-TAPPING SCREWS
Filed April 24, 1934

Inventor:
Axel V. Boggild,
by Harry E. Dunham
His Attorney.

Patented June 6, 1939

2,161,610

UNITED STATES PATENT OFFICE 2,161,610

METHOD AND APPARATUS FOR MAKING SELF-TAPPING SCREWS

Axel V. Boggild, Trumbull, Conn., assignor to General Electric Company, a corporation of New York Application April 24, 1934, Serial No. 722,078

37 Claims. (Cl. 80—9)

My invention relates to self tapping screws and the method of manufacturing them. In the manufacture of electric wiring devices, it has become a recent practice to secure metal parts to parts of insulating material by a force or drive fit between the metal and the member of insulating material. This practice is of interest because of its relatively low cost as compared with the old practice of molding metal inserts in the part of insulating material into which screws could be threaded to secure a metal part to the member of insulating material. However this practice is not entirely satisfactory because there is a tendency to break or fracture the member of insulating material frequently. Another practice has been somewhat developed of late which consists in molding or drilling an opening in the member of insulating material and then securing a metal part to it by means of a tap screw which will cut its own thread into the member of insulating material and will secure the metal part to it. This latter practice is quite satisfactory except for the relative high cost of the tap screw. The high cost of the tap screw is due to the necessity of first providing a thread on the screw and then milling longitudinal grooves in the screw to make the screw self tapping.

The object of my invention is to provide a self tapping screw which may be manufactured at no greater cost than an ordinary screw and which will work efficiently and satisfactorily as a self tapping screw for securing metal parts to members of insulating material.

What I consider to be novel and my invention will be better understood by reference to the following specification and appended claims when considered in connection with the accompanying drawing.

Figure 1:
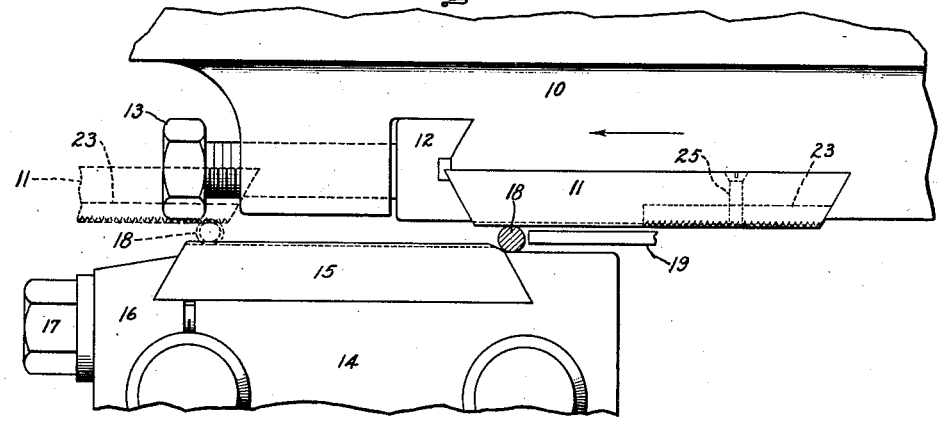
Figure 2:
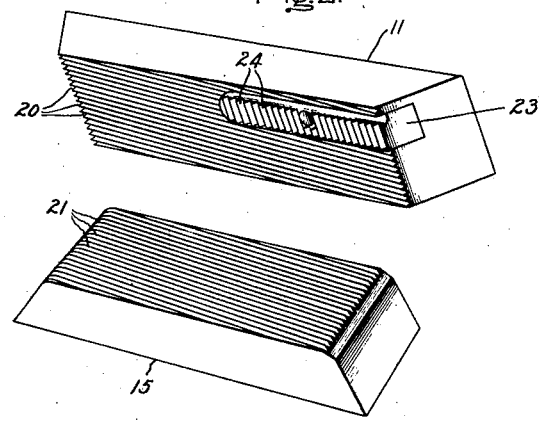
Figure 3:
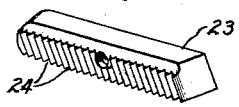
Figure 4:
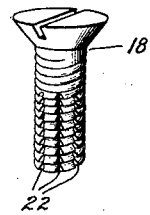

Referring to the drawing, Fig. 1 is a plan view of an improved machine embodying my invention for manufacturing self-tapping screws; Fig. 2 is a perspective view of the dies mounted in the machine of Fig. 1; Fig. 3 is a perspective view of an insert located in one of the dies of Fig. 2 and Fig. 4 shows in perspective a self-tapping screw manufactured in accordance with my invention.

By my invention a self tapping screw is provided which is manufactured by rolling a thread and longitudinal grooves in the shank of the screw simultaneously.

Referring particularly to Fig. 1, a reciprocating slide 10 carries a die 11 which is held in the slide by means of a clamp 12. Clamp 12 may be loosened or tightened by means of stud 13. An adjustable holder 14 carries a stationary die 15 which is held in position by a clamp 16 which may be loosened or tightened by means of stud 17.

In the manufacture of a screw, a rod or screw blank 18 is placed adjacent the right hand end of stationary die 15. As the die 11 moves to the left with recprocating slide 10, a starter rod 19 moves the rod or screw blank 18 to the left on the surface of die 15. Rod 18 is then gripped by the moving die 11 and rotated across the face of die 15. In the movement of the rod across the face of die 15 a thread is rolled on the rod. In the movement of the die 11 the rod 18 is rotated and so the die moves faster than the rod. The right hand end of the moving die 11 is shown in dotted lines just as the rod 18, which is also shown in dotted lines, passes from the left hand end of die 15. The threaded rod or screw blank 18 then passes to a receiving receptacle which is not shown on the drawing. As better indicated in Fig. 2, dies 11 and 15 are provided with angular grooves 20 and 21 respectively which form the thread on the rod 18 as it rolls between the two dies with the movement of die 11. To form longitudinal grooves 22 in the screw shown in Fig. 1 to make the screw self-tapping, an insert 23 is provided in die 11 which has transverse grooves 24. Insert 23 is secured in a slot provided in die 11 adjacent the right hand end by a screw 25 as indicated in dotted lines in Fig. 1. As the screw 18 rolls across the face of die 15 in engagement with die 11, the threads are formed in the shank of the screw. When the portion of die 11 carrying insert 23 first engages the screw 18, the longitudinal grooves are formed in the shank of the screw. The grooves 21 in die 15 serve to clean up any deposit of metal or burrs raised by engagement of the insert 23 with the screw 18 upon the continued relative movement of die 11 with respect to the screw 18 and die 15. In the movement of the screw 18 with respect to the insert 23, the longitudinal grooves 22 are formed at spaced intervals completely around the circumference of the screw. The number of these grooves 22 and their spacing is determined by the use to which the screw is to be placed and may be varied at will by the substitution of a different insert 23.

From the foregoing it may be seen that a self tapping screw with a rolled thread and longitudinal grooves is provided which may be manufactured at no greater cost than the manufacture of the ordinary screw.

What I claim as new and desire to secure by Letters Patent of the United States, is:

1. In the art of rolling screws and the like ribbed fasteners, the step of rolling a plurality of ribs on a fastener body and as a continuation in the rib-rolling operation eliminating a portion of each of the ribs to leave an interruption in the length of each rib.

2. In the art of forming screws and like fasteners, the steps of rotating a pin-like body against a die platen under sufficient pressure against the platen to form a rib thereon, and continuing said rotation and thereby depressing a cross section of the rib.

3. The art of forming screws and the like fasteners comprising rolling a fastener body and thereby flowing material of the body into an outstanding rib having an interruption in its length.

4. In the art of rolling screws and the like ribbed fasteners, the steps of rolling a rib on a fastener body and as a rolling operation continuous of the rib-rolling step eliminating a portion of the rib to leave an interruption in the length thereof.

5. In a machine for manufacturing screws, a die having angular grooves to form a thread in a metal rod and an insert in said die having a transverse rib to form a longitudinal groove in the rod interrupting the thread.

6. The method of forming a tap which comprises rolling a blank between thread forming dies and during the threading operation providing the tip of the blank with a longitudinally extending notch interrupting the threads at the tip of the blank.

7. In a screw threading machine, relatively movable dies having thread forming ribs, at least one of said dies having a portion adjacent an edge thereof presenting a working edge extending transversely of the ribs for the purpose of providing a blank with a longitudinally extending notch at its tip and in its threaded zone during the threading operation.

8. In the art of die rolling screws and like threaded articles, the step of forming a plurality of ribs on a blank and as a continuation of the rib-rolling operation rolling a series of grooved interruptions in said ribs, and flowing the displaced metal into rib-forming sections of the die.

9. The method of forming a threaded article which consists of rolling a metal rod between two dies, one die forming the thread and the other die forming longitudinal grooves in the threads.

10. The method of forming a threaded article which comprises rolling a blank between thread-forming dies and during the threading operation providing the tip of the blank with a longitudinally-extending notch interrupting the threads at the tip of the blank.

11. The method of forming a threaded article which comprises rolling a blank between thread-forming dies and during the thread-forming operation providing the tip of the blank simultaneously with a plurality of longitudinally extending notches interrupting the threads at the tip of the blank.

12. The method of forming a threaded article which comprises rolling a blank between thread-forming dies and during the threading operation pressure-indenting the tip of the blank to form therein a longitudinally extending notch interrupting the threads at the tip of the blank.

13. The method of forming a threaded article which comprises rolling a blank between thread-forming dies and during the threading operation pressure-indenting the tip of the blank to form simultaneously therein opposed longitudinally extending notches interrupting the threads at the tip of the blank.

14. In the art of forming screw-threaded fastener instruments, treating a blank between cooperating opposing dies provided respectively with groove-forming means and thread-forming means which are located to oppose one another and act upon opposite sides of the same portion of a blank simultaneously and thereby form a thread thereon and a groove therein intersecting the thread in a single operation.

15. A die for rolling a screw thread on a blank and a groove intersecting the thread thereof comprising a die block having thread-forming ridges on its face throughout a portion of the width of the die and projections outstanding at another portion of said face in position to form said groove in the course of the rolling of a thread on a blank incident to the engagement of the blank with said die face, the groove-forming projections being arranged along that edge portion of the face of the die corresponding to the entering end portion of the finished screw.

16. The method of forming a threaded article which comprises rolling a blank between thread-forming dies and during the threading operation subjecting the tip of the blank to a shearing action to form therein a longitudinally extending notch interrupting the threads at the tip of the blank.

17. A die for rolling a screw thread on a blank and a groove intersecting the thread thereof comprising a die block having thread-forming ridges on its face throughout a portion of the width of the die and projections outstanding at another portion of said face in position to form said groove in the course of the rolling of a thread on a blank incident to the engagement of the blank with said die face, the groove-forming projections being arranged along that edge portion of the face of the die corresponding to the entering end portion of the finished screw, and a cooperating die having thread-forming ridges corresponding to the thread-forming ridges of the first-mentioned die, and thread-forming ridges corresponding in location to the location of the projections on the first-mentioned die, the last-mentioned ridges being adapted to form threads intersected by the grooves produced by said projections.

18. In the art of forming screw-threaded fastener instruments, treating a blank between cooperating opposing dies provided respectively with groove-forming means and thread-forming means which are located to oppose one another and act upon opposite sides of the same portion of a blank simultaneously, and thereby form a thread thereon and a groove therein intersecting the thread in a single operation, and cleaning the thread and groove to eliminate extruded material therefrom.

19. Cooperating rolling dies comprising a die having a portion of its face formed with groove-producing tooth-like projections only, and a die cooperating therewith and having a corresponding cooperating portion provided with thread-forming ribs only opposing said tooth-like projections, whereby a fastener blank rolled between said dies is adapted to be simultaneously formed with a thread by one of the dies and a groove by the other with the groove intersecting the thread.

20. Cooperating rolling dies comprising a die having thread-forming ridges throughout a portion of its area, and a cooperating die having tooth-like groove-forming projections throughout a cooperating area opposing the ribs and positioned to act upon an interposed blank to form a groove lengthwise of the blank while the ribs of the other die are forming thread ridges spiralling about the blank and intersected by the groove.

21. The method of rolling a turn screw with a spiral thread interrupted by grooves, which comprises rolling a blank while again and again subjecting the blank alternately to thread pressing and groove pressing operations.

22. Cooperating rolling dies comprising a die having thread-forming ridges throughout a portion of its area, and a cooperating die having tooth-like groove-forming projections throughout a cooperating area opposing the ribs and positioned to act upon an interposed blank to form a groove lengthwise of the blank while the ribs of the other die are forming thread ridges spiralling about the blank and intersected by the groove, the groove pressing operations being performed at uniform intervals circumferentially of the blank, each interval being an aliquot part of the distance traversed by the blank in making a complete thread turn.

23. The method of rolling a turn screw with a spiral thread interrupted by grooves, which comprises rolling a blank while again and again subjecting the blank alternately to thread pressing and groove pressing operations, the thread valleys and the grooves being pressed into the blank from opposite sides of the blank so that the blank metal displaced at either pressing operation is unobstructed by the means for performing the other pressing operation.

24. A thread rolling die for use in rolling a turn screw with a spiral thread interrupted by longitudinal grooves, said die having throughout a portion of its width a series of thread rolling ribs, and having in another portion of its width a series of grooves forming projections, there being a plurality of such projections uniformly spaced in each full turn length of the die.

25. In a machine for manufacturing threaded articles, a die having angular grooves to form the thread in a metal rod and an insert in said die having transverse grooves to form longitudinal grooves in the rod.

26. In a machine for manufacturing threaded articles, a die having angular grooves to form the thread in a metal rod, and an insert in said die located adjacent one end and having transverse grooves to form longitudinal grooves in the rod.

27. In a machine for manufacturing threaded articles, a die having angular grooves to form the thread of the article, and an insert located in the surface of the die at one end of the die and having transverse grooves to form longitudinal grooves in the article.

28. The art as claimed in claim 14 wherein the thread is cold flowed from the material of the blank and material of the blank is also cold flowed to produce the groove, and the cold flowing to produce the groove being carried out progressively in a plurality of steps.

29. The art as claimed in claim 14 wherein the treatment is a rolling of the blank between dies, and after the formation of the thread and groove continuing the rolling between the dies sufficiently for clearing the thread and groove of extruded material.

30. In the art of rolling screws and the like ribbed fasteners, the step of rolling a thread-like rib on a fastener body and rolling away an intermediate portion of the rib to leave an interruption in the length of the rib.

31. The art of forming fasteners comprising rolling a fastener body by rotating the body about its major axis and thereby flowing material of the body into outstanding, spaced sections of a thread-like rib with a terminus of one of said rib sections at the place of the space abruptly outstanding from the body.

32. In the art of forming screws and the like ribbed fasteners with a rib having an interruption, the steps of flowing material of a fastener blank into an initial thread-like rib and flowing a portion of such rib away to form the interruption and leave outstanding sections of the rib.

33. In the art of making screws and the like fasteners, forming a thread-like rib on a fastener body, and rolling a portion of the rib away transversely through the rib.

34. In the art of making screws and the like fasteners, forming a thread-like rib on a fastener body, and rolling away successive portions of the rib across and through the rib.

35. The art as claimed in claim 34 wherein the successive rolled-away portions are rolled from the same area of the rib.

36. In the art of forming screws and like fasteners, the steps of rotating a pin-like body about its major axis, and forming of the material of the body a thread-like rib outstanding from the body and depressing a section of the rib transversely thereof back into the body.

37. The art of forming screws and like fasteners having a body provided with intersecting grooves defining respectively a thread-like rib outstanding therefrom and an interruption in the thread, which comprises forming one of said grooves in the body, and rolling the body between dies having projections pressing grooves intersecting said first grooves and having other projections fitting in said first grooves for clearing the grooves of material extruded therein by said first projections.

AXEL V. BOGGILD.